(12) United States Patent
Jeong et al.

(10) Patent No.: US 11,637,865 B2
(45) Date of Patent: Apr. 25, 2023

(54) I2NSF REGISTRATION INTERFACE YANG DATA MODEL

(71) Applicant: Research & Business Foundation Sungkyunkwan University, Suwon-si (KR)

(72) Inventors: Jaehoon Jeong, Busan (KR); Sangwon Hyun, Seoul (KR); Taekyun Roh, Suwon-si (KR); Sarang Wi, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 304 days.

(21) Appl. No.: 16/899,942

(22) Filed: Jun. 12, 2020

(65) Prior Publication Data
US 2020/0396257 A1    Dec. 17, 2020

(30) Foreign Application Priority Data

Jun. 12, 2019  (KR) .................. 10-2019-0069640
Jul. 24, 2019  (KR) .................. 10-2019-0089889
Mar. 9, 2020   (KR) .................. 10-2020-0028915

(51) Int. Cl.
*H04L 9/40*    (2022.01)
*G06F 8/65*    (2018.01)

(52) U.S. Cl.
CPC ............... *H04L 63/20* (2013.01); *G06F 8/65* (2013.01); *H04L 63/06* (2013.01)

(58) Field of Classification Search
USPC .......... 726/26, 2, 21, 36; 713/150, 163, 181; 380/255, 264, 276
See application file for complete search history.

(56) References Cited

U.S. PATENT DOCUMENTS

| | | | |
|---|---|---|---|
| 8,201,257 B1* | 6/2012 | Andres | G06F 21/568 726/25 |
| 8,205,240 B2* | 6/2012 | Ansari | H04L 12/2807 713/168 |
| 2001/0014150 A1* | 8/2001 | Beebe | H04L 63/20 379/189 |
| 2005/0060584 A1* | 3/2005 | Ginter | G06Q 20/123 375/E7.009 |
| 2006/0047419 A1* | 3/2006 | Diendorf | G06Q 10/08 340/552 |
| 2006/0101520 A1* | 5/2006 | Schumaker | H04L 63/1433 726/25 |
| 2009/0307776 A1* | 12/2009 | Curnyn | H04L 63/1408 726/24 |
| 2010/0138925 A1* | 6/2010 | Barai | H04L 63/1433 726/25 |
| 2011/0119742 A1* | 5/2011 | Maguire | H04L 9/32 726/25 |
| 2012/0066759 A1* | 3/2012 | Chen | G06F 21/554 726/15 |
| 2013/0167238 A1* | 6/2013 | Russell | G06F 21/577 726/25 |

* cited by examiner

*Primary Examiner* — Sharif E Ullah
(74) *Attorney, Agent, or Firm* — NSIP Law

(57) ABSTRACT

The present disclosure provides a registration method by a developer's management system in a security management system managing a Network Security Function (NSF) through a registration interface.

13 Claims, 11 Drawing Sheets

[FIG. 1]
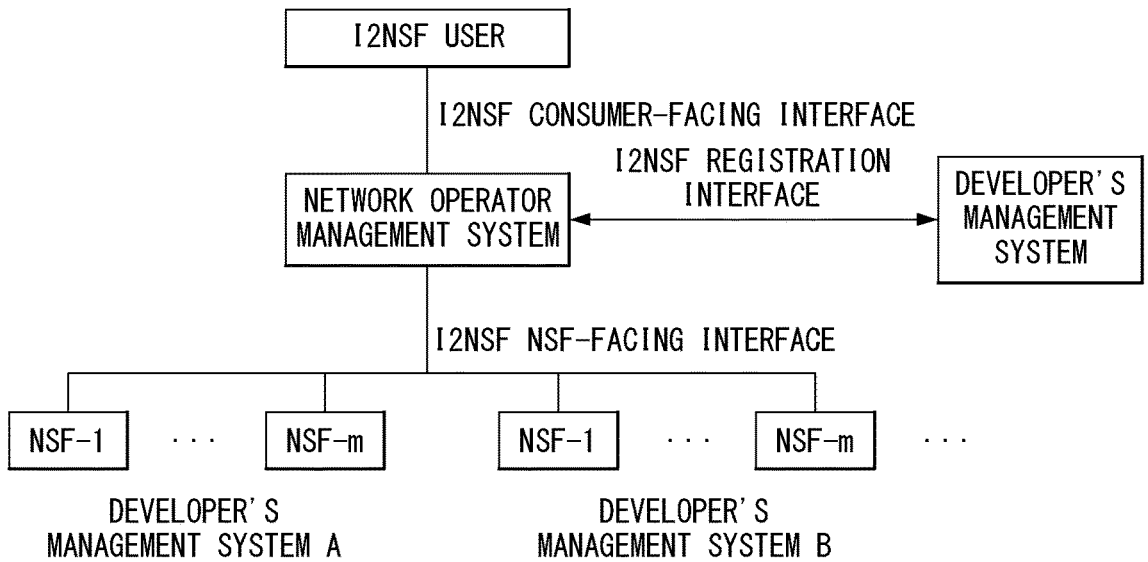
[FIG. 2]
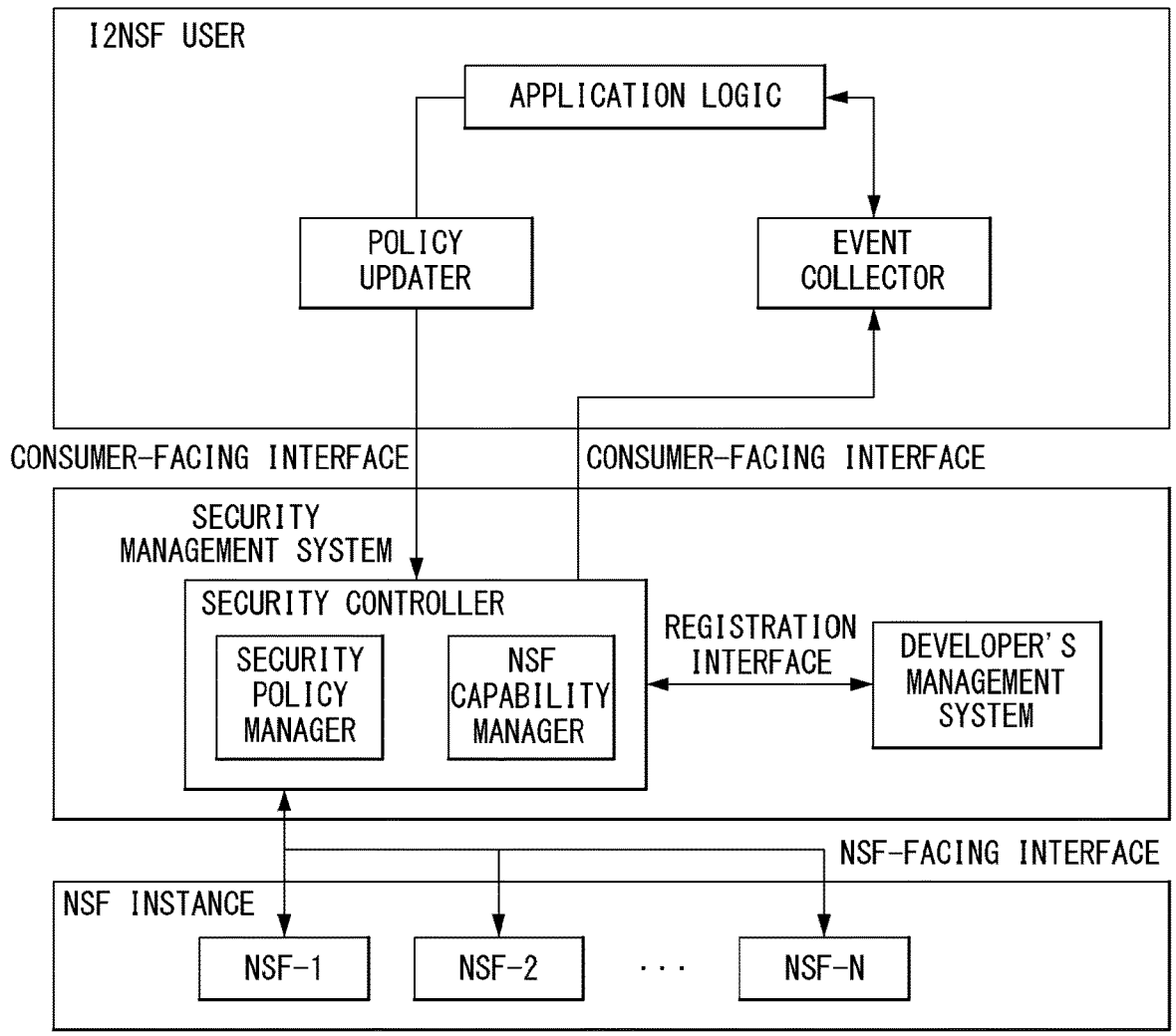

[FIG. 3]
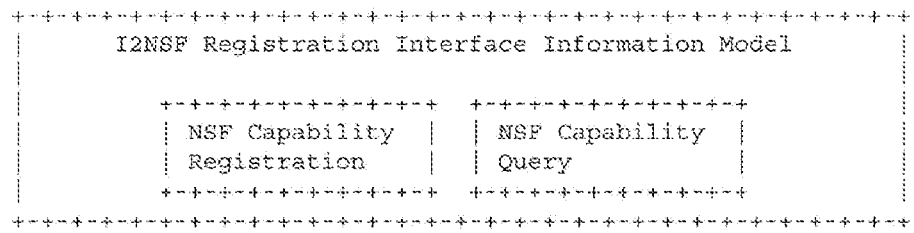
[FIG. 4]
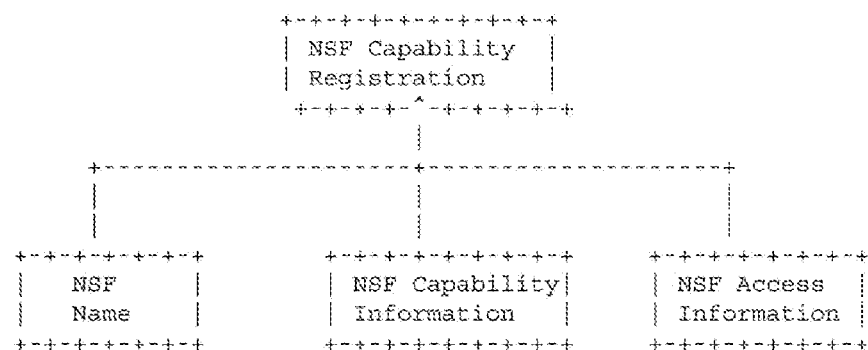
[FIG. 5]
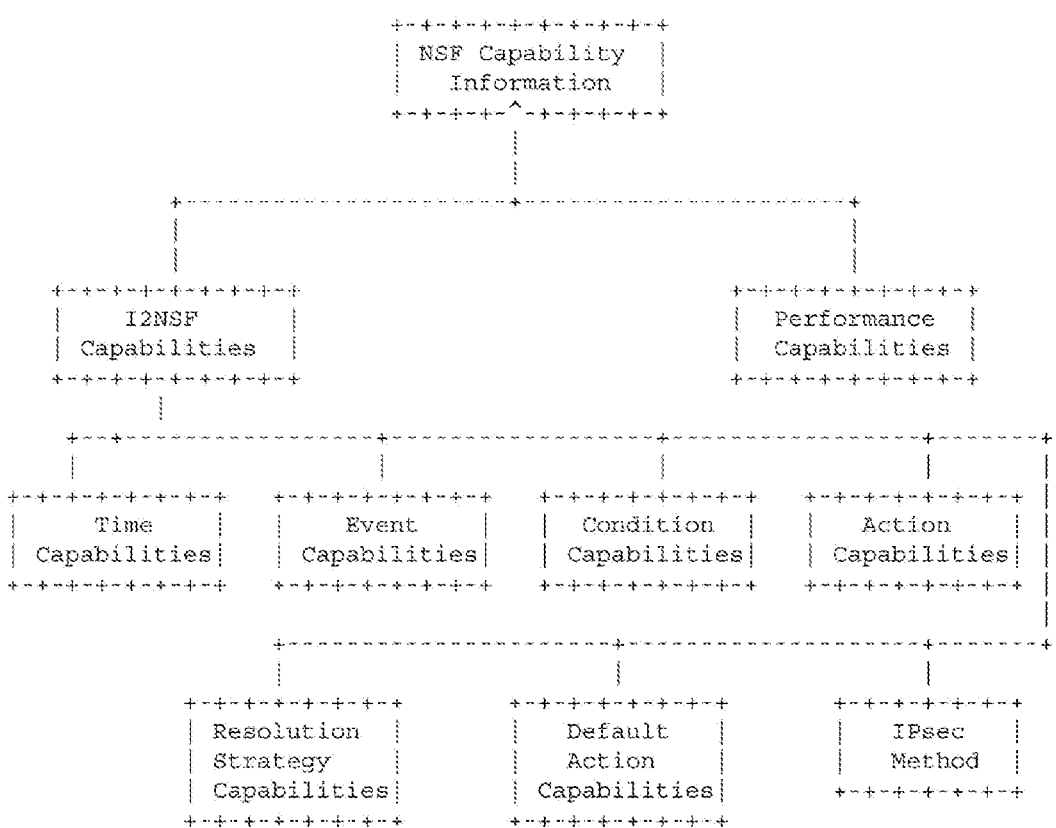

[FIG. 6]
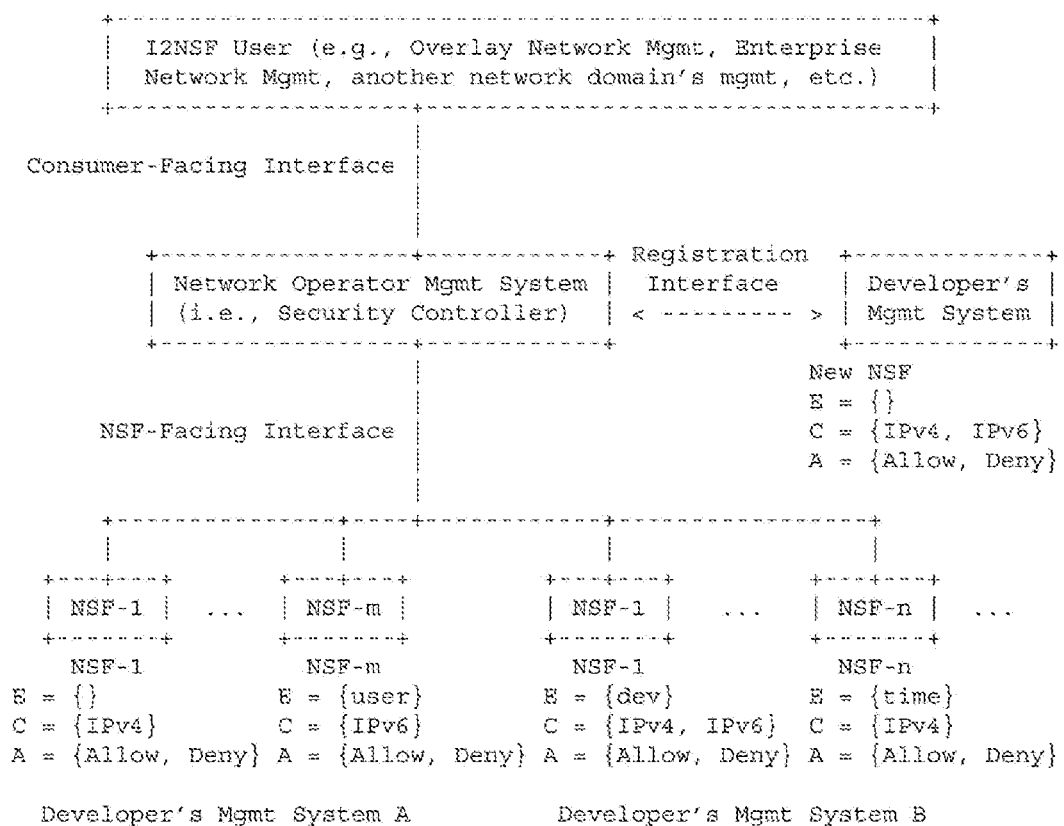

[FIG. 7]

```
module: ietf-i2nsf-capability
  +--rw nsf* [nsf-name]
     +--rw nsf-name                        string
     +--rw time-capabilities*                           enumeration
     +--rw event-capabilities
     |  +--rw system-event-capability*    identityref
     |  +--rw system-alarm-capability*    identityref
     +--rw condition-capabilities
     |  +--rw generic-nsf-capabilities
     |  |  +--rw ipv4-capability*      identityref
     |  |  +--rw ipv6-capability*      identityref
     |  |  +--rw tcp-capability*       identityref
     |  |  +--rw udp-capability*       identityref
     |  |  +--rw icmp-capability*      identityref
     |  +--rw advanced-nsf-capabilities
     |  |  +--rw anti-virus-capability*     identityref
     |  |  +--rw anti-ddos-capability*      identityref
     |  |  +--rw ips-capability*            identityref
     |  |  +--rw url-capability*            identityref
     |  |  +--rw voip-volte-capability*     identityref
     |  +--rw context-capabilities*         identityref
     +--rw action-capabilities
     |  +--rw ingress-action-capability*    identityref
     |  +--rw egress-action-capability*     identityref
     |  +--rw log-action-capability*        identityref
     +--rw resolution-strategy-capabilities*    identityref
     +--rw default-action-capabilities*         identityref
     +--rw ipsec-method*                        identityref
```

[FIG. 8a]

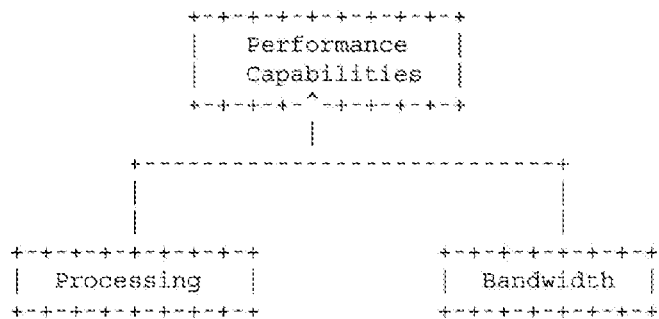

[FIG. 8b]

```
module : ietf-i2nsf-reg-interface
    +--rw nsf-capability-registration
    |   uses nsf-registrations rpcs :
    +---x i2nsf-capability-query
    |   uses nsf-capability-query
```

[FIG. 9]

```
NSF Capability Registration
+--rw nsf-registrations
   +--rw nsf-information*   [capability-name]
      +--rw capability-name                        string
      +--rw nsf-capability-info
      |   uses nsf-capability-info
            +--rw security-capability
            |   uses ietf-i2nsf-capability
            +--rw performance-capability
            |   uses performance-capability
      +--rw nsf-access-info
      |   uses nsf-access-info
            +--rw capability-name
            +--rw ip
            +--rw port
```

[FIG. 10]

```
I2NSF Capability Query
    +---x nsf-capability-query
        +---w input
        |   +---w query-nsf-capability
        |   |   uses ietf-i2nsf-capability
        +--ro output
            +--ro nsf-access-info
            |   uses nsf-access-info
                +--rw capability-name
                +--rw ip
                +--rw port
```

[FIG. 11]

```
NSF Capability Information
  +--rw nsf-capability-info
    +--rw security-capability
    |  uses ietf-i2nsf-capability
    +--rw performance-capability
    |  uses nsf-performance-capability
```

[FIG. 12]

```
NSF Performance Capability
  +--rw nsf-performance-capability
    +--rw processing
    |    +--rw processing-average   uint16
    |    +--rw processing-peak      uint16
    +--rw bandwidth
         +--rw outbound
         |    +--rw outbound-average    uint16
         |    +--rw outbound-peak       uint16
         +--rw inbound
         |    +--rw inbound-average     uint16
         |    +--rw inbound-peak        uint16
```

[FIG. 13]

```
NSF Access Information
  +--rw nsf-access-info
    +--rw capability-name    string
    +--rw ip         inet:ip-address
    +--rw port       inet:port-number
```

[FIG. 14a]

```
<CODE BEGINS> file "ietf-i2nsf-reg-interface@2020-03-09.yang"

module ietf-i2nsf-reg-interface {
   yang-version 1.1;

namespace "urn:ietf:params:xml:ns:yang:ietf-i2nsf-reg-interface";

prefix nsfreg;

import ietf-inet-types {
    prefix inet;
    reference "RFC 6991";
   }
   import ietf-i2nsf-capability {
    prefix capa;
    reference "draft-ietf-i2nsf-capability-data-model-05";
   } organization
     "IETF I2NSF (Interface to Network Security Functions)
      Working Group";

contact
     "WG Web: <http://tools.ietf.org/wg/i2nsf>
      WG List: <mailto:i2nsf@ietf.org>

Editor: Sangwon Hyun
```

[FIG. 14b]

```
     <mailto:shyun@mju.ac.kr>
     Editor: Jaehoon Paul Jeong
     <mailto:pauljeong@skku.edu>
     Editor: Taekyun Roh
     <mailto:tkroh0198@skku.edu>
     Editor: Sarang Wi
     <mailto:dnl9795@skku.edu>
     Editor: Jung-Soo Park
     <mailto:pjs@etri.re.kr>";

description
 "This module defines a YANG data model for I2NSF
  registration interface.

Copyright (c) 2020 IETF Trust and the persons
  identified as authors of the code. All rights reserved.

Redistribution and use in source and binary forms, with or
  without modification, is permitted pursuant to, and subject
  to the license terms contained in, the Simplified BSD License
  set forth in Section 4.c of the IETF Trust's Legal Provisions
  Relating to IETF Documents
  (http://trustee.ietf.org/license-info).

This version of this YANG module is part of RFC XXXX; see
  the RFC itself for full legal notices.";

revision "2020-03-09" {
 description "Initial revision";
 reference
   "RFC XXXX: I2NSF Registration Interface YANG Data Model";
} grouping nsf-performance-capability {
 description
   "Description of the performance capabilities of an NSF";

container processing {
  description
    "Processing power of an NSF in the unit of GHz (gigahertz)";

leaf processing-average {
   type uint16;
   description
     "Average processing power";
  }
  leaf processing-peak {
   type uint16;
```

[FIG. 14c]

```
    description
      "Peak processing power";
    }
  }
  container bandwidth {
   description
     "Network bandwidth available on an NSF
      in the unit of Mbps (megabits per second)";

container outbound {
    description
      "Outbound network bandwidth";
    leaf outbound-average {
     type uint32;
     units "Mbps";
     description
       "Average outbound bandwidth";
    }
    leaf outbound-peak {
     type uint32;
     units "Mbps";
     description
       "Peak outbound bandwidth";
    }
   }
   container inbound {
    description
      "Inbound network bandwidth";
    leaf inbound-average {
     type uint32;
     units "Mbps";
     description
       "Average inbound bandwidth";
    }
    leaf inbound-peak {
     type uint32;
     units "Mbps";
     description
       "Peak inbound bandwidth";
    }
   }
  }
 } grouping nsf-capability-info {
  description
    "Capability description of an NSF";
  container security-capability {
```

[FIG. 14d]

```
  description
    "Description of the security capabilities of an NSF";
  uses capa:nsf-capabilities;
  reference "draft-ietf-i2nsf-capability-data-model-05";
 }
 container performance-capability {
  description
    "Description of the performance capabilities of an NSF";
  uses nsf-performance-capability;
 }
} grouping nsf-access-info {
 description
   "Information required to access an NSF";
 leaf capability-name {
  type string;
  description
    "Unique name of this NSF's capability";
 }
 leaf ip {
  type inet:ip-address;
  description
    "IPv4/IPv6 address of this NSF";
 }
 leaf port {
  type inet:port-number;
  description
    "Port available on this NSF";
 }
} container nsf-registrations {
 description
   "Information of an NSF that DMS registers
    to Security Controller";
 list nsf-information {
  key "capability-name";
  description
    "Required information for registration";
  leaf capability-name {
   type string;
   mandatory true;
   description
     "Unique name of this registered NSF";
  }
  container nsf-capability-info {
   description
```

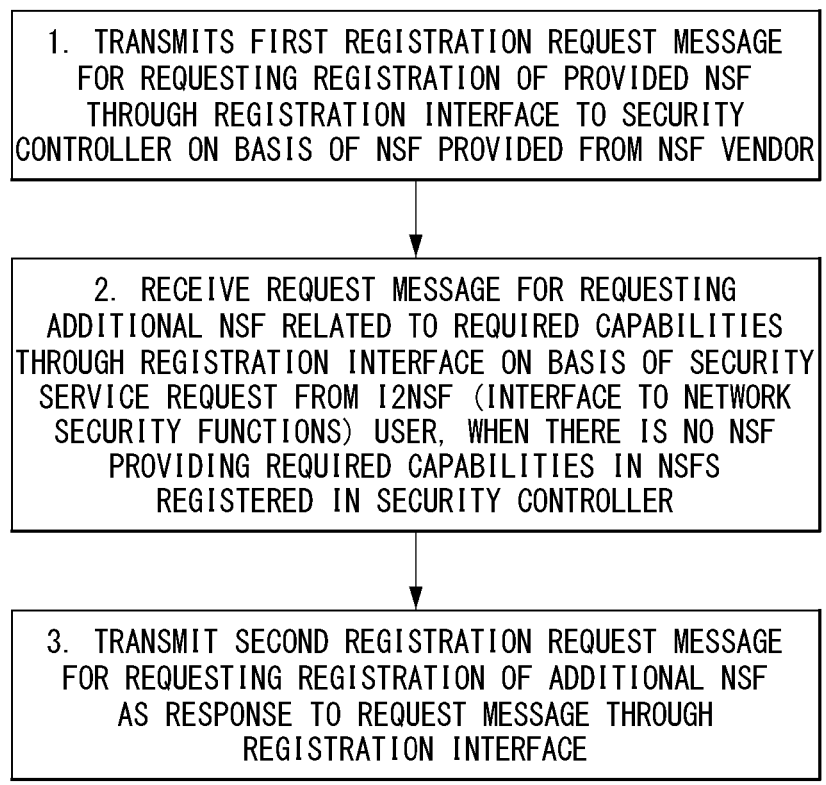
[FIG. 15]

I2NSF REGISTRATION INTERFACE YANG DATA MODEL

CROSS-REFERENCE TO RELATED APPLICATION

This application claims the benefit of Korean Patent Application No. 10-2019-0069640 filed on Jun. 12, 2019, No. 10-2019-0089889 filed on Jul. 24, 2019, and No. 10-2020-0028915 filed on Mar. 9, 2020. The contents of this application are hereby incorporated by reference in its entirety.

BACKGROUND OF THE DISCLOSURE

Field of the Disclosure

The present disclosure relates to a data model and, more particularly, to defining an information model and a YANG data model about a registration information between a security controller and a Developer's Management System (DMS) in Interface to Network Security Functions (I2NSF).

Related Art

When a network is connected to the whole world, it is possible to quickly access information regardless of geometrical distance. The internet is fundamentally composed of a large number of networks in which hierarchies of different levels are connected to each other.

The internet is operated in accordance with TCP/IP (transmission control protocol/internet protocol) published by IETF (Internet Engineering Task Force), and the TCP/IP can be found from RFC (Request For Comments) 703 and RFC 791 issued by IETF.

SUMMARY OF THE DISCLOSURE

An object of the present disclosure is to provide a method of defining an information model and a YANG data model about a registration information between a security controller and a Developer's Management System (DMS) in Interface to Network Security Functions (I2NSF).

Further, the present disclosure proposes a method of registering an NSF function and supporting a query through an I2NSF registration interface.

The technical subject to implement in the present disclosure are not limited to the technical problems described above and other technical subjects that are not stated herein will be clearly understood by those skilled in the art from the following specifications.

An aspect of the present disclosure provides a registration method by a developer's management system in a security management system managing a Network Security Function (NSF) through a registration interface, the registration method including: transmitting a first registration request message for requesting registration of a provided NSF through the registration interface to a security controller on the basis of the NSF provided from an NSF vendor; receiving a request message for requesting an additional NSF related to required capabilities through the registration interface on the basis of a security service request from an I2NSF (Interface to Network Security Functions) user, when there is no NSF providing the required capabilities in NSFs registered in the security controller; and transmitting a second request message for requesting registration of the additional NSF to the security controller as a response to the request message through the registration interface, in which the register interface includes 1) a first model for registering the capability of the NSF in the security controller and 2) a second model for requesting the additional NSF from the developer's management system.

Further, the registration method may further include: receiving an update request message for requesting update of the registered NSF capability from the security controller; and transmitting an update message as a response to the update request message to the security controller through the registration interface.

Further, the first model may include 1) an NSF name showing the peculiar name of an NSF that can be registered, 2) NSF capability information showing a capability set of the NSF that can be registered, and 3) NSF access information for the NSF that can be registered to communicate with a network.

Further, the NSF capability information may include a time capability, an event capability, a condition capability, and an action capability, a resolution strategy capability, and a fundamental action capability.

Further, the NSF capability information may further include performance capability information for showing a processing capability of the NSF that can be registered.

Further, the performance capability information may include 1) an available processing power value and 2) bandwidth value related to an available network to determine whether there is congestion of the NSF that can be registered.

Further, the request message may be based on the required capability created using the NSF capability information by the security controller.

Further, the NSF capability information may further include IPsec method capability information for designating the capability of an internet key exchange (IKE) supporting method for security communication with a network.

Another aspect of the present disclosure provides a developer's management system in a security management system managing a Network Security Function (NSF) through a registration interface, the developer's management system including: a transceiver for transmitting and receiving signals; a memory storing data; and a processor controlling the transceiver and the memory, in which the processor: transmits a first registration request message for requesting registration of a provided NSF through the registration interface to a security controller on the basis of the NSF provided from an NSF vendor, receives a request message for requesting an additional NSF related to required capabilities through the registration interface on the basis of a security service request from an I2NSF (Interface to Network Security Functions) user, when there is no NSF providing the required capabilities in NSFs registered in the security controller; and transmits a second request message for requesting registration of the additional NSF to the security controller as a response to the request message through the registration interface, in which the register interface includes 1) a first model for registering the capability of the NSF in the security controller and 2) a second model for requesting the additional NSF from the developer's management system.

BRIEF DESCRIPTION OF THE DRAWINGS

Accompanying drawings included as a part of the detailed description for helping understand the present disclosure provide embodiments of the present disclosure and are provided to describe technical features of the present disclosure with the detailed description.

FIG. 1 shows an I2NSF (Interface to Network Security Functions) system according to an embodiment of the present disclosure.

FIG. 2 exemplifies an architecture of the I2NSF system according to an embodiment of the present disclosure.

FIG. 3 is an example of an I2NSF Registration Interface Information Model to which the present disclosure can be applied.

FIG. 4 is an example of an NSF Capability Registration Sub-Model to which the present disclosure can be applied.

FIG. 5 is an example of NSF Capability Information to which the present disclosure can be applied.

FIG. 6 exemplifies the capability of an NSF in an I2NSF Framework according to an embodiment of the present disclosure.

FIG. 7 exemplifies a YANG data model architecture for an NSF capability according to an embodiment of the present disclosure.

FIG. 8a is an example of Performance Capability to which the present disclosure can be applied.

FIG. 8b is an example of YANG Tree of I2NSF Registration Interface to which the present disclosure can be applied.

FIG. 9 is an example of a YANG Tree of NSF Capability Registration Module to which the present disclosure can be applied.

FIG. 10 is an example of a YANG Tree of NSF Capability Query Module to which the present disclosure can be applied.

FIG. 11 is an example of YANG Tree of I2NSF NSF Capability Information to which the present disclosure can be applied.

FIG. 12 is an example of YANG Tree of I2NSF NSF Performance Capability to which the present disclosure can be applied.

FIG. 13 is an example of YANG Tree of I2NSF NSF Access Information to which the present disclosure can be applied.

FIG. 14a to FIG. 14d are examples of a Registration Interface YANG Data Model to which the present disclosure can be applied.

FIG. 15 is an embodiment to which the present disclosure can be applied.

DESCRIPTION OF EXEMPLARY EMBODIMENTS

Hereinafter, preferred embodiments of the present disclosure will be described in detail with reference to the accompanying drawings. The detailed description that will be provided with the accompanying drawings is provided to explain exemplary embodiments of the present disclosure and is not intended to unique embodiments that can implement the present disclosure. The following detailed description includes details to help complete understand the present disclosure. However, those skilled in the art know that the present disclosure can be implemented even without the details.

In some cases, well-known structures and devices may be omitted or the important capability of each structure and device may be shown in a block diagram type to avoid making the concept of the present disclosure unclear.

Specific terms that are used in the following description are provided to help understand the present disclosure, and use of these specific terms may be changed in other ways without departing from the technical spirit of the present disclosure.

Recently, a fundamental standard interface for an NFV-based security function is developed by an NFV-based security function working group. This is a portion of the international internal standard organization called an IETF (Internet Engineering Task Force).

The object of the I2NSF is for defining a standardized interface for a heterogeneous NSF(s) (network security function) provided by several security solution vendors.

In an I2NSF architecture, without considering management of an NSF(s) in detail (management of NSF requires enforcement of a security policy), a user can define a protection policy for protecting network resources in a network system. Further, an interface standardized to an NSF(s) from several vendors can simplify setting and managing of tasks for a heterogeneous NSF(s).

FIG. 1 shows an I2NSF (Interface to Network Security Functions) system according to an embodiment of the present disclosure.

Referring to FIG. 1, an I2NSF system includes an I2NSF user, a network operator management system, a developer's management system, and/or at least one NSF (Network Security Function).

The I2NSF user communicates with the network operator management system through an I2NSF consumer-facing interface. The network operator management system communicates with an NSF(s) through an I2NSF NSF-facing interface. The developer's management system communicates with the network operator management system through an I2NSF registration interface. Hereafter, each component of an I2NSF system (I2NSF component) and each interface (I2NSF interface) are described.

I2NSF User

An I2NSF user is an I2NSF component that requests information from another I2NSF component (e.g., a network operator management system) and/or uses a service (e.g., a network security service) provided by another I2NSF component (e.g., a developer's management system). For example, the I2NSF user may be an overlay network management system, an enterprise network manager system, another network domain manager, etc.

The object that performs the functions designated to the I2NSF user component may be referred to as an I2NSF consumer. As an example of the I2NSF consumer, a video-conference network manager that needs to dynamically give a notice to an underlay network to allow, rate-limit, or reject flow on the basis of a specific field of a packet for a time span, enterprise network administrators and management systems that needs to request a vendor network to enforce a specific I2NSF policy for specific flow, and an IoT management system that transmits a request to an underlay network to block flow coinciding with a set of a specific condition may be included.

The I2NSF user can create and distribute a high-level security policy. In detail, the I2NSF user needs to use a network security service to protect a network traffic from various malicious attacks. In order to request this security service, the I2NSF user can create a high-level security policy for a security service that it desires, and can inform the network operator management system of the high-level security polity.

Meanwhile, in the process of preparing the high-level security polity, the I2NSF user has to consider the type of an NSF(s) required to implement a security service or a security policy rule configuration for each NSF(s).

Further, the I2NSF user can be notified of a security event(s) in underlying an NSF(s) by the network operator management system. By analyzing the security event(s), the I2NSF user can recognize new attacks and can update (or create) a high-level security policy for dealing with the new attacks. As described above, the I2NSF user can define, manage, and monitor a security policy.

Network Operator Management System

The network operator management system is a component that performs collection, distribution, and point for providing security, monitoring, and other actions. For example, the network operator management system may be a security controller. The network operator management system may be managed by a network security manager and may be referred to as an I2NSF management system.

One of the important functions of the network operator management system (or security controller) is to translate a high-level security policy (or policy rule) from the I2NSF user into a low-level security policy rule for a specific NSF(s). The network operator management system (or security controller) may receive a high-level security policy from the I2NSF user and determine the type of an NSF(s) required to enforce a policy requested first by the I2NSF user. Further, the network operator management system (security controller) may create a low-level security policy for each requested NSF(s) As a result, the network operator management system (or security controller) may set the created low-level security policy to each NSF(s).

Further, the network operator management system (or security controller) may monitor an NSF(s) that is being in driven in a system, and may maintain various items of information (e.g., network access information and a workload state) about each NSF(s). Further, the network operator management system (or security controller) may dynamically manage the pool of an NSF instance through dynamic life-cycle management of the NSF instance with the assistance of the developer's management system.

NSF

The NSF is a logical entity or a software component that provides a security-related service. For example, the NSF may receive a low-level security policy, and may sense and block or attenuate a malicious network traffic on the basis of the low-level security policy. Accordingly, integrity and confidentiality of a network communication stream can be secured.

Developer's Management System

The developer's management system is an I2NSF component that sends information to another I2NSF component (e.g., the I2NSF user or the network operator management system) and/or provide a service (e.g., a network security service). The developer's management system may be referred to as a vendor's management system. An object that performs a function designated to the developer's management system may be referred to as an I2NSF producer.

The developer's management system may be managed by a third-party security vendor that provides an NSF(s) to the network operator management system. Several developer's management systems of various security vendors may exist.

I2NSF Consumer-Facing Interface (Briefly, Consumer-Facing Interface (CFI)

The CFI is an interface to an I2NSF system of a user, positioned between the I2NSF user and the network operator management system. By being designed in this way, only an abstract view of an NSF(s) is provided to a user with the details of an underlying NSF(s) hidden.

The CFI may be used to enable different users of an I2NSF system to define, manage, and monitor a security policy for specific flow in a management domain. A high-level security policy (policy rule) created by the I2NSF user may be transmitted to the network operator management system through the CFI I2NSF NSF-Facing Interface (Briefly, NSF-Facing Interface (NFI)

The NFI is an interface positioned between the network operator management system (or security controller) and an NSF(s).

The NFI may be used to designate and monitor a flow-based security policy enforced by one or more NSFs. For example, the I2NSF system may use a flow-based NSF. In this case, the flow-based NSF is an NSF that examines network from in accordance with a set of policies to reinforce the security characteristic. Flow-based security by the flow-based NSF means that packets are examined in the received order and there is no correction for the packets in accordance with an examination process. The interface for the flow-based NSF may be classified as follows:

NSF Operational and Administrative Interface: An interface group used by the I2NSF management system to program the operation state of an NSF; this interface group also includes a management control capability. The I2NSF policy rule is one method of changing the interface group in a consistent manner. Since an application and an I2NSF component need to dynamically control the actions of traffics that they transmit and receive, most of I2NSF efforts are concentrated on the interface group.

Monitoring Interface: An interface group used by the I2NSF management system to obtain monitoring information of one or more selected NSFs; each interface of this interface group may be a query- or report-based interface. The difference between the two is that the query-based interface is used by the I2NSF management system to obtain information, but the report-based interface is used by an NSF to provide information. The capability of the interface group may also be defined by another protocol such as LOG[RFC 5424] and DOTS (Distributed Denial-of-Service Open Threat Signaling) [RFC 8782]. The I2NSF management system may take one or more actions on the basis of reception of information. This should be designated by a policy rule. The interface group does not change the operation state of an NSF.

As described above, the NFI may be developed using a flow-based paradigm. The common trait of the flow-based NSF is to process a packet on the basis of the contents (e.g., header/payload) and/or context (e.g., a session state and an authentication state) of a received packet. This trait is one of requirements for defining the action of the I2NSF system.

Meanwhile, the I2NSF system does not need to use all abilities of a given NSF and does not need to use all available NSFs. Accordingly, this abstraction enables an NSF feature to be handled in a building block by an NSF system. Therefore, a developer may freely use a security capability defined by an individual NSF for a vendor and a technology.

I2NSF Registration Interface (Briefly, Registration Interface (RI)

The RI is an interface positioned between the network operator management system and the developer's management system. NSFs provided by different vendors may have different capabilities. Accordingly, in order to automate a process that uses various types of security capabilities provided by different vendors, the vendors need to have an exclusive interface for determining the capabilities of their NSFs. These exclusive interfaces may be referred to as I2NSF registration interface (RI).

The capability of an NSF may be configured in advance or may be dynamically searched through an I2NSF registration interface. If a new capability that is exposed to a consumer is added to an NSF, in order that interested management and control entity can know that, a new capability needs to be registered on an I2NSF registry through the I2NSF registration interface.

FIG. 2 exemplifies an architecture of the I2NSF system according to an embodiment of the present disclosure. The I2NSF system of FIG. 2 shows in more detail the configuration of an I2NSF user and a network operator management system in comparison to the I2NSF system of FIG. 1. In FIG. 2, description overlapping the detailed description of FIG. 1 is omitted.

Referring to FIG. 2, an I2NSF system includes an I2NSF user, a security management system, and an NSF instance hierarchy. An I2NSF user hierarchy includes an application logic, a policy updater, and an event collector as components. A security management system hierarchy includes a security controller and a developer's management system. The security controller of the security management system hierarchy includes a security policy manager and an NSF capability manager as components.

The I2NSF user hierarchy communicates with the security management system hierarchy through a consumer-facing interface. For example, the policy updater and the event collector of the I2NSF user hierarchy communicates with the security controller of the security management system hierarchy through a consumer-facing interface. Further, the security management system hierarchy communicates with an NSF instance hierarchy through an NSF-facing interface. For example, the security controller of the security management system hierarchy communicates with an NSF instance(s) of the NSF instance hierarchy through the NSF-facing interface. Further, the developer's management system of the security management system hierarchy communicates with the security controller of the security management system hierarchy through a registration interface.

The I2NSF user hierarchy, the security controller component of the security management system hierarchy, the developer's management system component of the security management system hierarchy, and the NSF instance hierarchy of FIG. 2 respectively correspond to the I2NSF user hierarchy, the network operator management system component, the developer's management system component, and the NSF component of FIG. 1. Further, the consumer-facing interface, the NSF-facing interface, and the registration interface of FIG. 2 correspond to the consumer-facing interface, the NSF-facing interface, and the registration interface of FIG. 1. Hereafter, newly defined components included in each hierarchy are described.

I2NSF User

As described above, an I2NSF user hierarchy includes the following three components: an application logic, a policy updater, and an event collector. The function and action of each component are as follows.

The application logic is a component that creates a high-level security policy. To this end, the application logic receives an event for updating (or creating a high-level policy from the event collector and updates (or creates) the high-level policy on the basis of the collected event. Thereafter, the high-level policy is sent to the policy updater to be distributed to the security controller. In order to update (or create) the high-level policy, the event collector receives events sent by the security collector and sends them to the application logic. On the basis of this feedback, the application logic may update (or create) the high-level security policy.

In FIG. 2, the application logic, the policy updater, and the event collector are shown as individual configurations, but the present disclosure is not limited thereto. In other words, each of them is a logic component and may be implemented as one or two components in the I2NSF system.

Security Management System

As described above, the security controller of the security management system hierarchy includes two components such as a security policy manager and an NSF capability manager.

The security policy manager may receives a high-level policy from the policy updater through the CFI and may map the policy to a low-level policy. The low-level policy is related to a given NSF capability registered in an NSF capability manager. Further, the security policy manager may transmit the policy to an NSF(s) through the NFI.

The NSF capability manager may designate the capability of an NSF registered by the developer's management system and share the capability with the security policy manager to create a low-level policy related to a given NSF capability. Every time a new NSF is registered, the NSF capability manager may request the developer's management system to register the capability of the NSF in a management table of the NSF capability manager through the registration interface. The developer's management system correspond to another part of the security management system fro registering the capability of a new NSF to the NSF capability manager.

In FIG. 2, the security policy manager and the NSF capability manager are shown as individual configurations, but the present disclosure is not limited thereto. In other words, each of them is a logic component and may be implemented as one component in the I2NSF system.

NSF Instances

As shown in FIG. 2, the NSF instance hierarchy includes NSFs. In this case, all the NSFs are positioned in the NSF instance hierarchy. Meanwhile, a high-level policy is mapped to a low-level policy and then the security policy manager transmits the policy to the NSF(s) through the NFI. In this case, the NSF may sense and block or attenuate a malicious network traffic on the basis of the received low-level security policy.

For quick development of a virtualization system, a high-class security capability is required in various scenarios (e.g., the network device of an enterprise network, the user equipment of a mobile network, a device of the internet, or a resident access user).

NSFs produced by several security companies may provide various security capabilities to customers. That is, regardless of whether NSF are implemented by a physical or virtual capability, several NSF may provide a security service for a given network traffic by being combined with each other.

A security capability means a capability related to security of a series of networks that can be used for enforcing a security policy. The security capability is independent from an actually implemented security control mechanism and a set of capabilities that can be provided by NSFs is registered in all NSFs.

The security capability is a market leader providing a method that can define customized security protection by clearly explaining the security capability provided by a specific NSF. Further, the company supplying the security capability may be explained in a neutral manner through the security capability.

That is, it is not required to state a specific product and a feature may be considered for each capability when designing a network.

As described above, as the I2NSF interface that can be used for providing a security policy, two types may exist as follows.

An interface and a security controller between an I2NSF user and an application program (Consumer-Facing Interface): Service-directional interface providing NSF data and a communication channel between a service user and a network operator management system (or security controller).

The I2NSF Consumer-Facing Interface enables security information to be used for exchange between various applications (e.g., OpenStack or various BSS/OSS components) and a security controller. The design target of the Consumer-Facing Interface is to implement and separate specs of a security service.

An interface (e.g., a firewall, anti-invasion or anti-virus) and a security controller between NSFs (NSF-Facing interface): The NSF-Facing Interface is used to separate a security management system from an NSF set and several implements and is independent in the manner in which an NSF is implemented (e.g., a virtual machine or actual appliances).

Hereafter, an object-directional information model about network security, contents security, and an attach attenuation capability is described with related I2NSF policy objects.

In the present disclosure, terms used in an information module may be defined as follows.

AAA: Access control, Authorization, Authentication
ACL: Access Control List
(D)DoD: (Distributed) Denial of Service (attack)
ECA: Event-Condition-Action
FMR: First Matching Rule (resolution strategy)
FW: Firewall
GNSF: Generic Network Security Function
HTTP: HyperText Transfer Protocol
I2NSF: Interface to Network Security Functions
IPS: Intrusion Prevention System
LMR: Last Matching Rule (resolution strategy)
MIME: Multipurpose Internet Mail Extensions
NAT: Network Address Translation
NSF: Network Security Function
RPC: Remote Procedure Call
SMA: String Matching Algorithm
URL: Uniform Resource Locator
VPN: Virtual Private Network Objectives Registering NSFs to I2NSF framework: Developer's Management System (DMS) in I2NSF framework is typically run by an NSF vendor, and uses Registration Interface to provide NSFs developed by the NSF vendor to Security Controller. DMS registers NSFs and their capabilities to I2NSF framework through Registration Interface. For the registered NSFs, Security Controller maintains a catalog of the capabilities of those NSFs.

Updating the capabilities of registered NSFs: After an NSF is registered into Security Controller, some modifications on the capability of the NSF may be required later. In this case, DMS uses Registration Interface to update the capability of the NSF, and this update should be reflected in the catalog of NSFs.

Asking DMS about some required capabilities: In cases that some security capabilities are required to serve the security service request from an I2NSF user, Security Controller searches through the registered NSFs to find ones that can provide the required capabilities. But Security Controller might fail to find any NSFs having the required capabilities among the registered NSFs. In this case, Security Controller needs to request DMS for additional NSF(s) that can provide the required security capabilities via Registration Interface.

FIG. 3 is an example of an I2NSF Registration Interface Information Model to which the present disclosure can be applied.

The I2NSF registration interface is used by Security Controller and Developer's Management System (DMS) in I2NSF framework.

Referring to FIG. 3, the information model of the I2NSF registration interface, which consists of two submodels: NSF capability registration and NSF capability query. Each submodel is used for the operations listed above. The remainder of this section will provide in-depth explanations of each submodel.

NSF Capability Registration

FIG. 4 is an example of an NSF Capability Registration Sub-Model to which the present disclosure can be applied.

Referring to FIG. 4, this submodel is used by DMS to register an NSF to Security Controller. FIG. 4 shows how this submodel is constructed. The most important part in FIG. 4 is the NSF capability, and this specifies the set of capabilities that the NSF to be registered can offer. The NSF Name contains a unique name of this NSF with the specified set of capabilities. When registering the NSF, DMS additionally includes the network access information of the NSF which is required to enable network communications with the NSF. The following will further explain the NSF capability information and the NSF access information in more detail.

NSF Capability Information

FIG. 5 is an example of NSF Capability Information to which the present disclosure can be applied.

NSF Capability Information basically describes the security capabilities of an NSF. Referring to FIG. 5, we show capability objects of an NSF. Following the information model of NSF capabilities defined in [capability-dm], we share the same I2NSF security capabilities: Time Capabilities, Event Capabilities, Condition Capabilities, Action Capabilities, Resolution Strategy Capabilities, Default Action Capabilities, and IPsec Method [i2nsf-ipsec]. Also, NSF Capability Information additionally contains the performance capabilities of an NSF as shown in FIG. 5.

Capability-Dm/i2nsf-Ipsec

FIG. 6 exemplifies the capability of an NSF in an I2NSF Framework according to an embodiment of the present disclosure. FIG. 6 exemplifies the capability of an NSF in an I2NSF Framework according to an embodiment of the present disclosure.

Referring to FIG. 6, a network operator management system (Mgmt) of an NSF developer may register an NSF and a capability that a network security apparatus can support. In order to register an NSF in this way, the developer Mgmt system uses a YANG data model of the standardized capability through a registration interface. The capability of the network security apparatus is maintained and managed at the center, whereby the security apparatus may be easily managed.

The NSF-Facing interface may be used to configure a security policy rule of a common network security capability [draft-ietf-i2nsf-nsf-nsf-face-dm], and the NSF-monitoring interface may be used to configure a security policy rule of each high-class network security capability [draft-dong-i2nsf-asf-asf-config].

When the network developer applies a security policy rule for blocking a malicious user, it may be a large burden to apply all of necessary rules to NSFs one by one. This problem may be solved by managing the capability of the NSFs.

For example, when the network manager blocks a malicious user with an IPv6, the network manager may transmit a security policy rule blocking the user to the Mgmt system using an I2NSF user (i.e., a web browser or software).

When receiving the security policy rule, the network operator management system may support a necessary capability by automatically transmitting the security policy rule to an appropriate NSF (i.e., an NSF-m of the developer's management system A and an NSF-1 of the developer's management system B) (i.e., IPv6). Accordingly, the I2NSF user does not need to consider the NSF to which the rule is applied.

If an NSF meets a malicious packet, it may be a large burden for the network manager to apply a rule blocking malicious packets one by one to the NSF. This problem may be solved by managing the capability of the NSFs.

For example, when the NSF finds out a suspicious IPv4 packet, it may request information about the suspicious IPv4 packet from the network operator management system to change a specific rule and/or configuration. When receiving the information, the network operator management system may examine the information about the suspicious IPv4 packet. When a wide packet is determined as a malicious packet, the Mgmt System makes and transmits a security policy rule to an appropriate NSF (i.e., an NSF-1 of the developer's Mmgt system A and the NSF-1 and NSF-n of the developer's Mgmt system B), thereby being able to support a capability for managing the security policy rule. Accordingly, a new security policy rule blocking malicious packets may be applied to an appropriate NSF without intervention of a person.

FIG. 7 exemplifies a YANG data model architecture for an NSF capability according to an embodiment of the present disclosure.

Referring to FIG. 7, an NSF capability is included in an YANG data model. The NSF capability includes a time capability, an event capability, a condition capability, and a action capability, a resolution strategy capability, and a fundamental action capability.

The time capability is used to designate a capability for designating the execution time of an I2NSF policy rule. The time capability is defined in view of absolute time and periodical time. The absolute time means accurate time of start or end. The periodical time means repeated time such as a day, a week, or a month.

The event capability is used to designate a method of triggering execution of a condition of the I2NSF policy rule.

The event capability defined in this way is defined as a system event and a system alarm. The event capability may be expanded in accordance with a specific vendor condition capability. The event capability is described in detail in [draf-ietf-i2nsf-capability].

The condition capability is used to designate a known property, a property to be compared with a feature and/or a value set, and the capability of the feature and/or the set of values in order to determine whether a set of actions related to a corresponding (revealed) I2NSF policy rule can be executed. The condition capability is classified into a common network security capability and a high-class network security capability.

The condition capability for the common network security capability may be defined as an IPv4 capability, an IPv6 capability, a TCP capability, a UDP capability, and an ICMP capability. The state capability of the high-class network security capability may be defined as an anti-virus capability, an anti-DDos capability, an IPS capability, and HTTP capability, and a VoIP/VoLTE capability. The condition capability may be expanded in accordance with a specific vendor condition capability. The condition capability is described in detail in [draf-ietf-i2nsf-capability].

The action capability is used to designate the capability of a method of controlling and monitoring a flow-based NSF side when an event and a condition are satisfied. The action capability may be defined as a reception operation capability, a transmission operation capability, and a log operation capability. The action capability may be expanded in accordance with the action capability of a specific vendor. The action capability is described in detail in [draft-ietf-i2nsf-1991].

A resolution strategy capability is used to designate a method of solving a collision generated between actions of the same or different policy rules included in a specific NSF. The resolution strategy capability may be defined as an FMR (First Matching Rule), an LMR (Last Matching Rule), a PMR (Priority Matching Rule), a PMR (Priority Matching Rule) with Errors (PMRE), a PMRN (Priority Matching Rule with No Errors), etc. The resolution strategy capability may be expanded in accordance with the action capability of a specific vendor. The resolution strategy capability is described in detail in [[draf-ietf-i2nsf-capability].

When there is no rule that coincides with a received packet, in order to designate a method of executing a policy rule, a default action capability is used. The default action capability may be defined as pass, drop, reject, warn, and mirror. The default action capability may be expanded in accordance with the action capability of a specific vendor. The default action capability is described in detail in [[draf-ietf-i2nsf-capability].

An IPsec method capability is used to designate the capability of an internet key exchange (IKE) support method for security communication. The default action capability may be defined as IKE and IKE-less. The default action capability may be expanded in accordance with the action capability of a specific vendor. The default action capability is described in detail in [draft-ietf-i2nsf-sdn-ipsec-flow-protection].

Performance Capabilities

FIG. 8a is an example of Performance Capability to which the present disclosure can be applied. Referring to FIG. 8a, this information represents the processing capability of an NSF. Assuming that the current workload status of each NSF is being collected through NSF monitoring [i2nsf-monitoring], this capability information of the NSF can be used to determine whether the NSF is in congestion by comparing it with the current workload of the NSF. Moreover, this information can specify an available amount of each type of resource, such as processing power which are available on the NSF. (The registration interface can control the usages and limitations of the created instance and make the appropriate request according to the status.) As illustrated in FIG. 8, this information consists of two items: Processing and Bandwidth. Processing information describes the NSFs available processing power. Bandwidth describes the information about available network NSF Access Information NSF Access Information contains the followings that are required to communicate with an NSF: IPv4 address, IPv6 address, port number, and supported transport protocol(s) (e.g., Virtual Extensible LAN (VXLAN) [RFC 7348], Generic Protocol Extension for VXLAN (VXLAN-GPE) [nvo3-vxlan-gpe], Generic Route Encapsulation (GRE), Ethernet etc.). In this document, NSF Access Information is used to identify a specific NSF instance (i.e. NSF Access Information is the signature (unique identifier) of an NSF instance in the overall system).

NSF Capability Query

Security Controller may require some additional capabilities to serve the security service request from an I2NSF user, but none of the registered NSFs has the required capabilities. In this case, Security Controller makes a description of the required capabilities by using the NSF capability information sub-model, and sends DMS a query about which NSF(s) can provide these capabilities.

Data Model

1. I2NSF Registration Interface

FIG. 8b is an example of YANG Tree of I2NSF Registration Interface to which the present disclosure can be applied.

Referring to FIG. 8b, the I2NSF registration interface is used for the following purposes. Developer's Management System (DMS) registers NSFs and their capabilities into Security Controller via the registration interface. In case that Security Controller fails to find any NSF among the registered NSFs which can provide some required capabilities, Security Controller uses the registration interface to query DMS about NSF(s) having the required capabilities. The following sections describe the YANG data models to support these operations.

(1) NSF Capability Registration

FIG. 9 is an example of an YANG Tree of NSF Capability Registration Module to which the present disclosure can be applied. Referring to FIG. 9, when registering an NSF to Security Controller, DMS uses this module to describe what capabilities the NSF can offer. DMS includes the network access information of the NSF which is required to make a network connection with the NSF as well as the capability description of the NSF.

(2) NSF Capability Query

FIG. 10 is an example of a YANG Tree of NSF Capability Query Module to which the present disclosure can be applied. Referring to FIG. 10, Security Controller may require some additional capabilities to provide the security service requested by an I2NSF user, but none of the registered NSFs has the required capabilities. In this case, Security Controller makes a description of the required capabilities using this module and then queries DMS about which NSF(s) can provide these capabilities. Use NETCONF RPCs to send a NSF capability query. Input data is query-i2nsf-capability-info and output data is nsf-access-info. In FIG. 10, the ietf-i2nsf-capability refers to the module defined in [capability-dm].

2. NSF Capability Information

FIG. 11 is an example of YANG Tree of I2NSF NSF Capability Information to which the present disclosure can be applied. Referring to FIG. 11, an expanding architecture of the nsf-capability-info described above is exemplified. The ietf-i2nsf-capability refers to the module defined in [capability-dm]. The performance-capability is used to specify the performance capability of an NSF.

FIG. 12 is an example of YANG Tree of I2NSF NSF Performance Capability to which the present disclosure can be applied. FIG. 12 is an example of the nsf-performance-capability described above.

Referring to FIG. 12, this module is used to specify the performance capabilities of an NSF, when registering or initiating the NSF.

3. NSF Access Information

FIG. 13 is an example of YANG Tree of I2NSF NSF Access Information to which the present disclosure can be applied.

Referring to FIG. 13, this module contains the network access information of an NSF that is required to enable network communications with the NSF.

YANG Data Modules

FIG. 14 is an example of a Registration Interface YANG Data Model to which the present disclosure can be applied. Referring to FIG. 14, this section provides YANG modules of the data model for the registration interface between Security Controller and Developer's Management System.

Security Considerations

The YANG module specified in this document defines a data schema designed to be accessed through network management protocols such as NETCONF [RFC6241] or RESTCONF [RFC8040]. The lowest NETCONF layer is the secure transport layer, and the required secure transport is Secure Shell (SSH) [RFC6242]. The lowest RESTCONF layer is HTTPS, and the required secure transport is TLS [RFC8446].

The NETCONF access control model RFC83411 provides a means of restricting access to specific NETCONF or RESTCONF users to a preconfigured subset of all available NETCONF or RESTCONF protocol operations and content.

There are a number of data nodes defined in this YANG module that are writable/creatable/deletable (i.e., config true, which is the default). These data nodes may be considered sensitive or vulnerable in some network environments. Write operations (e.g., edit-config) to these data nodes without proper protection can have a negative effect on network operations. These are the subtrees and data nodes and their sensitivity/vulnerability:

nsf-registrations: The attacker may exploit this to register a compromised or malicious NSF instead of a legitimate NSF to the Security Controller.

nsf-performance-capability: The attacker may provide incorrect information of the performance capability of any target NSF by illegally modifying this.

nsf-capability-info: The attacker may provide incorrect information of the security capability of any target NSF by illegally modifying this.

nsf-access-info: The attacker may provide incorrect network access information of any target NSF by illegally modifying this.

Some of the readable data nodes in this YANG module may be considered sensitive or vulnerable in some network environments. It is thus important to control read access (e.g., via get, get-config, or notification) to these data nodes. These are the subtrees and data nodes and their sensitivity/vulnerability:

nsf-registrations: The attacker may try to gather some sensitive information of a registered NSF by sniffing this.

nsf-performance-capability: The attacker may gather the performance capability information of any target NSF and misuse the information for subsequent attacks.

nsf-capability-info: The attacker may gather the security capability information of any target NSF and misuse the information for subsequent attacks.

nsf-access-info: The attacker may gather the network access information of any target NSF and misuse the information for subsequent attacks.

The RPC operation in this YANG module may be considered sensitive or vulnerable in some network environments. It is thus important to control access to this operation. The following is the operation and its sensitivity/vulnerability:

nsf-capability-query: The attacker may exploit this RPC operation to deteriorate the availability of the DMS and/or gather the information of some interested NSFs from the DMS.

FIG. 15 is an embodiment to which the present disclosure can be applied.

Referring to FIG. 15, a security management system that manages NSF (Network Secure Function) includes a developer's management system, an I2NSF (Interface to Network Security Functions) user, and a security controller. The developer management system and the security controller may be connected through a registration interface. In more detail, the registration interface may include 1) a first model for registering the capability of the NSF in the security controller and 2) a second model for requesting the additional NSF from the developer's management system.

1. The developer's management system, on the basis of an NSF provided from an NSF vendor, transmits a first registration request message for requesting registration of the provided NSF through a registration interface to the security controller.

2. The developer's management system, on the basis of a security service request from the I2NSF (Interface to Network Security Functions) user, when there is no NSF providing required capabilities in the NSFs registered in the security controller, receives a request message for requesting an additional NSF related to the required capabilities through the registration interface. For example, the security controller may be connected with the I2NSF through an I2NSF consumer-facing interface.

3. A second registration request message for requesting registration of the additional NSF is transmitted as a response to the request message through the registration interface.

In addition, when update of the registered NSF capability is required, the developer's management system may receive an update request message for requesting update of the registered NSF capability from the security controller and may transmit an update message as a response to the update request message to the security controller through the registration interface.

The embodiments described above are predetermined combinations of the components and the features of the present disclosure. Each component or feature, unless specifically stated, should be considered as being selective. Each component or feature may be implemented in a type in which they are not combined with other components or features. Further, embodiments of the present disclosure may be configured by combining some components and/or features. The order of the actions described in embodiments of the present disclosure may be changed. Some components or features of any embodiment may be included in another embodiment and may be replaced with corresponding configurations and features of another embodiment. Unless specifically referred in claims, it is apparent that an embodiment may be configured by combining claims or new claims may be included through amendment after application.

Embodiments of the present disclosure may be implemented by various measures, such as hardware, firmware, software, or combinations thereof. When hardware is used, an embodiment of the present disclosure may be implemented by one or more of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a processor, a controller, a micro controller, and a micro processor.

In the case of an implementation by firmware or software, the embodiments described in the present disclosure may be implemented in the form of a module, a procedure, or a function for performing the capabilities or actions described above. The software code may be stored in a memory and driven by the processor. The memory may be located inside or outside the processor, and may exchange data with the processor by various well-known means.

It is apparent to those skilled in the art that the present disclosure can be embodied in other specific types within a range not departing from the necessary characteristics of the present disclosure. Accordingly, the detailed description should not be construed as being limited in all respects and should be construed as an example. The scope of the present disclosure should be determined by reasonable analysis of the claims and all changes within an equivalent range of the present disclosure is included in the scope of the present disclosure.

INDUSTRIAL APPLICABILITY

The present disclosure may be applied to various security management systems.

According to the present disclosure, it is possible to define an information model and a YANG data model about a registration information between a security controller and a Developer's Management System (DMS) in Interface to Network Security Functions (I2NSF).

Further, according to the present disclosure, it is possible to register g an NSF function and support a query through an I2NSF registration interface.

The effects of the present disclosure are not limited to the effects described above and other effects can be clearly understood by those skilled in the art from the following description.

What is claimed is:

1. A registration processor-implemented method by a developer's management system in a security management system managing a Network Security Function (NSF) based on a registration interface, the registration method comprising:

transmitting, by the developer's management system, a first registration request message for requesting registration of a provided NSF based on the registration interface to a security controller based on the NSF provided from an NSF vendor;

receiving, by the developer's management system, a request message for requesting an additional NSF related to required capabilities based on the registration interface based on a security service request from an I2NSF (Interface to Network Security Functions) user, when there is no NSF providing the required capabilities in NSFs registered in the security controller; and transmitting, by the developer's management system, a second registration request message for requesting registration of the additional NSF to the security controller in response to the request message based on the registration interface, wherein the registration interface comprises a first model for registering a capability of the NSF in the security controller, and a second model for requesting the additional NSF from the developer's management system, wherein the first model comprises:

an NSF name showing a unique name of an NSF that can be registered;

NSF capability information showing a capability set of the NSF that can be registered; and NSF access information for the NSF that can be registered to communicate with a network, wherein the NSF capability information includes an event capability, a condition capability, and an action capability, a resolution strategy, capability, and a default action capability, and wherein the NSF capability information further includes bandwidth information related to an available network.

2. The registration method of claim 1, further comprising:

receiving, by the developer's management system, an update request message for requesting update of the registered NSF ca pa bility from the security controller; and transmitting, by the developer's management system, an update message in response to the update request message to the security controller based on the registration interface.

3. The registration method of claim 1, wherein the NSF capability information further includes performance capability information for showing a processing capability of the NSF that can be registered.

4. The registration method of claim 3, wherein the performance capability information comprises:

an available processing power value to determine whether there is congestion of the NSF that can be registered.

5. The registration method of claim 1, wherein the request message is based on the required capability created based on the NSF capability information by the security controller.

6. The registration method of claim 4, wherein the NSF capability information further includes IPsec method capability information for designating the capability of an internet key exchange (IKE) supporting method for security communication with a network.

7. A developer's management system in a security management system managing a Network Security Function (NSF) based on a registration interface, the developer's management system comprising:

a memory configured to store instructions; and a processor configured to execute the instructions to configure the processor to:

transmit a first registration request message for requesting registration of a provided NSF based on the registration interface to a security controller based on the NSF provided from an NSF vendor;

receive a request message for requesting an additional NSF related to required capabilities based on the registration interface based on a security service request from an I2NSF (Interface to Network Security Functions) user, when there is no NSF providing the required capabilities in NSFs registered in the security controller; and transmit a second registration request message for requesting registration of the additional NSF to the security controller in response to the request message based on the registration interface, wherein the registration interface comprises a first model for registering a capability of the NSF in the security controller, and a second model for requesting the additional NSF from the developer's management system, wherein the first model comprises:

an NSF name showing a unique name of an NSF that can be registered;

NSF capability information showing a capability set of the NSF that can be registered; and NSF access information for the NSF that can be registered to communicate with a network, and wherein the NSF capability information includes an event capability, a condition capability, and an action capability, a resolution strategy, ca pa bility, and a default action capability, and wherein the NSF capability information further includes bandwidth information related to an available network.

8. The developer's management system of claim 7, wherein the processor is further configured to:

receive an update request message for requesting update of the registered NSF capability from the security controller, and transmit an update message in response to the update request message to the security controller based on the registration interface.

9. The developer's management system of claim 7, wherein the NSF capability information includes a time capability, an event capability, a condition capability, and an action capability, a resolution strategy, capability, and a default action capability.

10. The developer's management system of claim 9, wherein the NSF capability information further includes performance capability information for showing a processing capability of the NSF that can be registered.

11. The developer's management system of claim 10, wherein the performance capability information comprises:

an available processing power value to determine whether there is congestion of the NSF that can be registered.

12. The developer's management system of claim 7, wherein the request message is based on the required capability created based on the NSF capability information by the security controller.

13. The developer's management system of claim 11, wherein the NSF capability information further includes IPsec method capability information for designating the capability of an internet key exchange (IKE) supporting method for security communication with a network.

* * * * *